United States Patent [19]
Tomoda et al.

[11] Patent Number: 5,227,974
[45] Date of Patent: Jul. 13, 1993

[54] REAR WHEEL TURNING SYSTEM FOR FOUR-WHEEL STEERED VEHICLE

[75] Inventors: Atsuo Tomoda; Shin Takehara; Ryuya Akita, all of Hiroshima, Japan

[73] Assignee: Mazda Motor Corporation, Hiroshima, Japan

[21] Appl. No.: 661,198

[22] Filed: Feb. 27, 1991

[30] Foreign Application Priority Data

Feb. 28, 1990 [JP] Japan .................................. 2-48650

[51] Int. Cl.⁵ .......................... B62D 6/00; B62D 5/04
[52] U.S. Cl. .............................. 364/424.05; 180/140; 180/142
[58] Field of Search .................... 364/424.01, 424.05; 180/140, 141, 142, 143, 79.1; 280/91

[56] References Cited

U.S. PATENT DOCUMENTS

| | | | |
|---|---|---|---|
| 4,679,809 | 7/1987 | Ito et al. | 364/424.05 X |
| 4,706,979 | 11/1987 | Kawabe et al. | 364/424.05 X |
| 4,773,012 | 9/1988 | Ito et al. | 364/424.05 X |
| 4,834,204 | 5/1989 | Ito et al. | 180/140 |
| 4,872,116 | 10/1989 | Ito et al. | 364/424.05 |
| 4,878,557 | 11/1989 | Shibahata et al. | 364/424.05 X |
| 4,964,481 | 10/1990 | Sano et al. | 180/140 |
| 5,089,967 | 2/1992 | Haseda et al. | 364/424.05 X |

FOREIGN PATENT DOCUMENTS 57-44568  3/1982  Japan .

Primary Examiner—Thomas G. Black
Assistant Examiner—Thomas S. Auchterlonie
Attorney, Agent, or Firm—Sixbey, Friedman, Leedom & Ferguson

[57] ABSTRACT

A rear wheel turning system for a four-wheel steered vehicle includes a rear wheel turning mechanism for turning the rear wheels of the vehicle, a front wheel turning angle sensor which detects a turning angle of front wheels $\theta_F$, a vehicle speed sensor which detects a vehicle speed $V$, a yaw rate detector which detects a yaw rate $\dot{\Psi}$ of the vehicle, a yaw acceleration detector which detects a yaw acceleration $\ddot{\Psi}$ of the vehicle, and a control unit which causes the rear wheel turning mechanism to turn the rear wheels by a target rear wheel turning angle $TG\theta_R$ which is defined by formula $$TG\theta_R = -K_1 \cdot \theta_F + K_2 \cdot V \cdot \dot{\Psi} + K_3 \cdot V \cdot \ddot{\Psi}$$

wherein $K_1$, $K_2$ and $K_3$ respectively represent positive coefficients. The coefficient $K_3$ is increased with increase in the vehicle speed $V$ over a predetermined range of vehicle speed where the coefficient $K_2$ is constant.

6 Claims, 4 Drawing Sheets

F I G.2
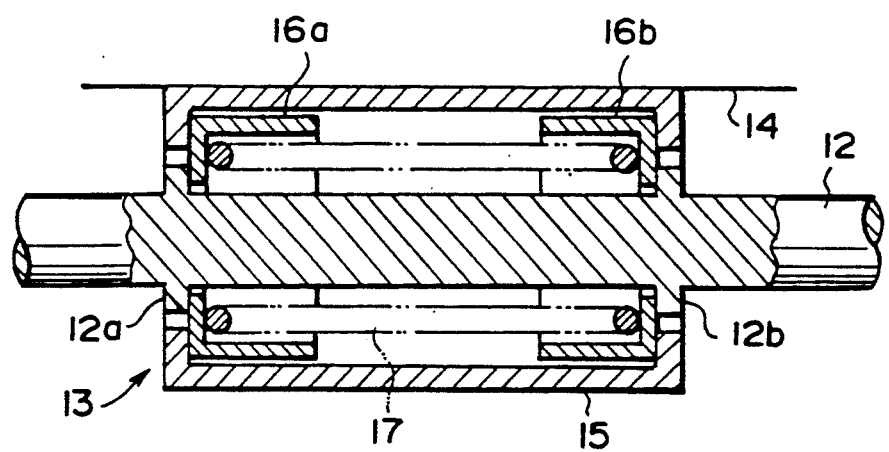

REAR WHEEL TURNING SYSTEM FOR FOUR-WHEEL STEERED VEHICLE

BACKGROUND OF THE INVENTION

1. Field of the Invention

This invention relates to a rear wheel turning system for a four-wheel steered vehicle, and more particularly to a rear-wheel turning system in which the rear wheel turning angle relative to the front wheel turning angle is changed according to the yaw rate of the vehicle.

2. Description of the Prior Art

In a rear wheel turning system disclosed in Japanese Unexamined Patent Publication No. 57(1982)-44568, the rear wheels are turned according to the lateral acceleration or the yaw rate of the vehicle in order to compensate for influence of external disturbance such as side wind. That is, the rear wheel turning system comprises a rear wheel turning mechanism which turns the rear wheels, a yaw rate detecting means which detects the yaw rate of the vehicle, and a control means which causes the rear wheel turning mechanism to turn the rear wheels by a target rear wheel turning angle which is determined according to the yaw rate as detected by the yaw rate detecting means.

By such a rear wheel turning system, the running stability of the vehicle can be improved. However since the rear wheels are turned in the same direction as the front wheels when the front wheels are turned, the heading performance of the vehicle deteriorates. In this specification, that the rear wheels are turned in the same direction as the front wheels will be expressed as "the rear wheels are turned in the same phase", and that the rear wheels ar turned in the direction opposite to the front wheels is expressed as "the rear wheels are turned in the reverse phase".

When the rear wheels are momentarily turned in the reverse phase at the beginning of a turn, desired heading performance can be obtained and at the same time the subsequent running stability of the vehicle can be ensured. More particularly, when the target rear wheel turning angle is defined by the following formula, the rear wheels are momentarily turned in the reverse phase from the time the front wheels are turned to the time the position of the vehicle is actually changed and the yaw rate is detected.

$$TG\theta_R{'} = -K_1 \cdot \theta_F + K_2 \cdot V \cdot \dot{\Psi} \quad (1)$$

wherein $TG\theta_R{'}$ represents the target rear wheel turning angle, $K_1$ and $K_2$ respectively represent positive coefficients, $\theta_F$ represents the front wheel turning angle, V represents the vehicle speed and $\dot{\Psi}$ represents the yaw rate. When the rear wheel turning angle is positive, the rear wheels are turned in the same phase and the rear wheel turning angle is negative, the rear wheels are turned in the reverse phase.

However, when the target rear wheel turning angle is determined according to the formula (1), the control system can oscillate because the signal which represents the actual position of the mechanical system and is fed back to the control system is apt to lag behind the control signal.

When the yaw acceleration $\ddot{\Psi}$ is added to the formula (1) as the following formula (2) and the target rear wheel turning angle $TG\theta_R$ defined by the formula (2) is used, such an oscillation of the control system can be suppressed.

$$TG\theta_R = -K_1 \cdot \theta_F + K_2 \cdot V \cdot \dot{\Psi} + K_3 \cdot V \cdot \ddot{\Psi} \quad (2)$$

wherein $K_1$, $K_2$ and $K_3$ respectively represent positive coefficients.

However, when the contribution of the third term, $K_3 \cdot V \cdot \ddot{\Psi}$, to the target rear wheel turning angle $TG\theta_R$ becomes too large, the effect of the first term, $-K_1 \cdot \theta_F$, that is, the effect that the rear wheels are momentarily turned in the reverse phase and the heading performance is improved cannot be sufficiently enjoyed.

SUMMARY OF THE INVENTION

In view of the foregoing observations description, the primary object of the present invention is to provide a rear wheel turning system in which an improved heading performance can be obtained at the beginning of a turn and at the same time, oscillation of the control system can be effectively suppressed.

The present invention is based on the fact that the control system oscillates mainly in high vehicle speed range, and in accordance with the present invention, the contribution of the third term in the formula (2) to the target rear wheel turning angle is increased with increase in the vehicle speed.

That is, in accordance with the present invention, there is provided a rear wheel turning system for a four-wheel steered vehicle comprising a rear wheel turning mechanism for turning the rear wheels of the vehicle, a front wheel turning angle detecting means which detects a turning angle of front wheels $\theta_F$, a vehicle speed detecting means which detects a vehicle speed V, a yaw rate detecting means which detects a yaw rate $\dot{\Psi}$ of the vehicle, a yaw acceleration detecting means which detects a yaw acceleration $\ddot{\Psi}$ of the vehicle, and a control means which causes the rear wheel turning mechanism to turn the rear wheels by a target rear wheel turning angle $TG\theta_R$ which is defined by formula $$TG\theta_R = -K_1 \cdot \theta_F + K_2 \cdot V \cdot \dot{\Psi} + K_3 \cdot V \cdot \ddot{\Psi}$$

wherein $K_1$, $K_2$ and $K_3$ respectively represent positive coefficients, characterized in that the coefficient $K_3$ is increased with increase in the vehicle speed V.

With this arrangement, in the high vehicle speed range where the control system is apt to oscillate, response to control is improved and accordingly, oscillation of the control system can be effectively suppressed though the heading performance at the beginning of a turn is sacrificed to some extent. In the low to middle engine speed range where the control system cannot oscillate, better heading performance is ensured.

BRIEF DESCRIPTION OF THE DRAWINGS

FIG. 2 is an enlarged cross-sectional view of the neutralizing mechanism.

DESCRIPTION OF THE PREFERRED EMBODIMENT

Figure 1:
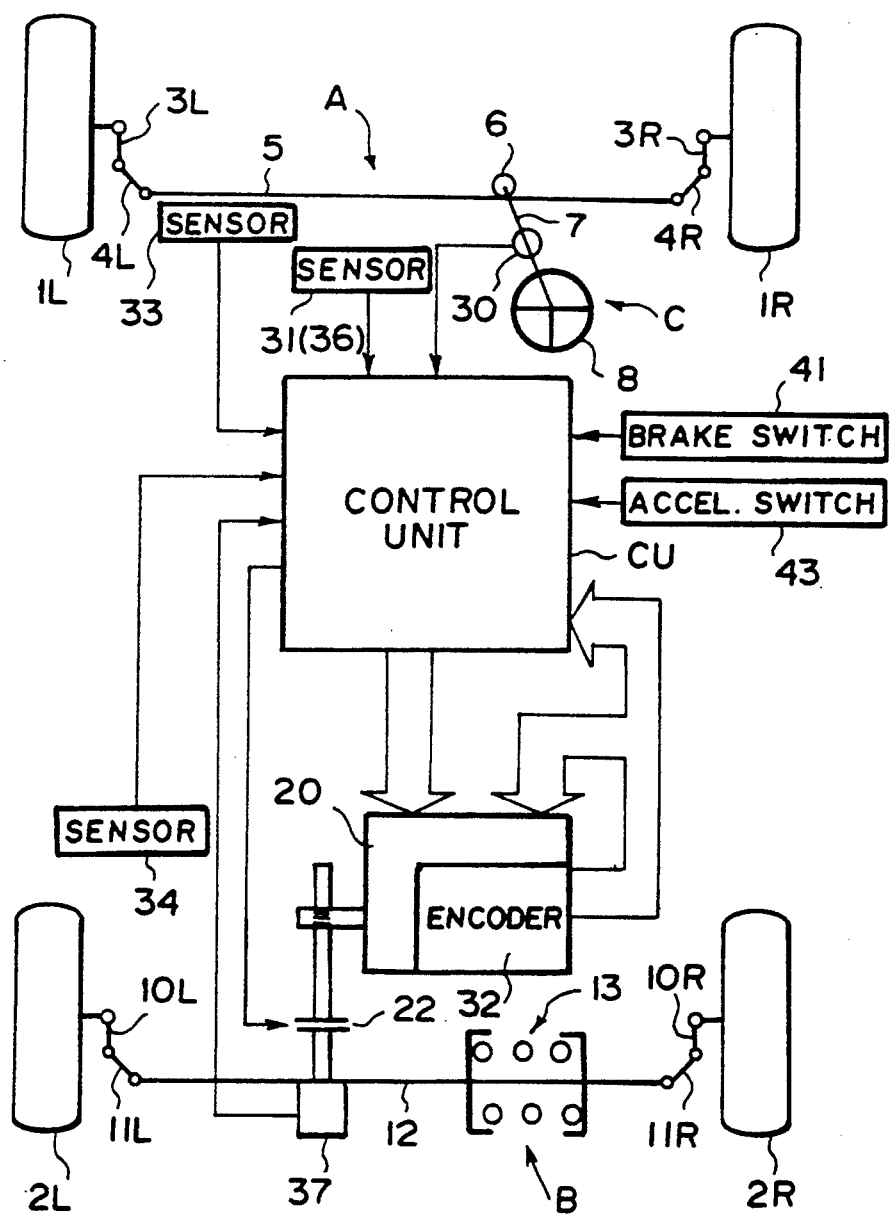
FIG. 1 is a schematic view showing a four-wheel steered vehicle provided with a rear wheel turning system in accordance with an embodiment of the present invention.

In FIG. 1, left and right front wheels 1L and 1R are turned by a front wheel turning mechanism A, and left and right rear wheels 2L and 2R are turned by a rear wheel turning mechanism B.

The front wheel turning mechanism A comprises a pair of knuckle arms 3L and 3R, a pair of tie rods 4L and 4R, and a connecting rod 5 which connects the tie rods 4L and 4R. The front wheel turning mechanism A is associated with a rack-and-pinion steering system C which comprises a pinion 6, a steering shaft 7 and a steering wheel 8.

When the steering wheel 8 is turned right and left, the front wheels 1L and 1R are turned right and left by an angle corresponding to the angle by which the steering wheel 8 is turned.

The rear wheel turning mechanism B comprises a pair of tie rods 11L and 11R and a connecting rod 12 which connects the tie rods 11L and 11R. The connecting rod 12 is provided with a neutralizing mechanism 13 which urges the connecting rod 12 in a neutral position in which the connecting rod 12 holds the rear wheels 2L and 2R in the straight ahead position.

As shown in FIG. 2, the neutralizing mechanism 13 comprises a casing 15 fixed to the vehicle body 14, a pair of spring retainers 16a and 16b which are fitted in the casing 15 to be movable in the transverse direction of the vehicle body or the longitudinal direction of the connecting rod 12, and a compression spring 17 disposed between the spring retainers 16a and 16b. The connecting rod 12 extends through the casing 15 and is provided with a pair of flange portions 12a and 12b. The flange portions 12a and 12b respectively abut against the spring retained 16a and 16b from outside, whereby the connecting rod 12 is urged to the neutral position by the spring 17. The compression spring 17 has a spring force which withstands the side force acting on the connecting rod 12 during cornering.

The rear wheel turning mechanism B is driven by a servomotor 20 which is connected to the connecting rod 12 by way of a clutch 22.

When the clutch 22 is in engagement, the connecting rod 22 is displaced left in response to rotation of the servomotor 20 in one direction and is displaced right in response to rotation of the servomotor 20 in the other direction. Thus the rear wheels 2L and 2R are turned left and right by an angle corresponding to the amount of rotation of the servomotor 20.

When the clutch 22 disengages, the connecting rod 12 is returned to the neutral position under the force of the neutralizing mechanism 13 and held there. That is, when the clutch 22 disengages, the vehicle behaves as a two-wheel steered vehicle.

Figure 3:
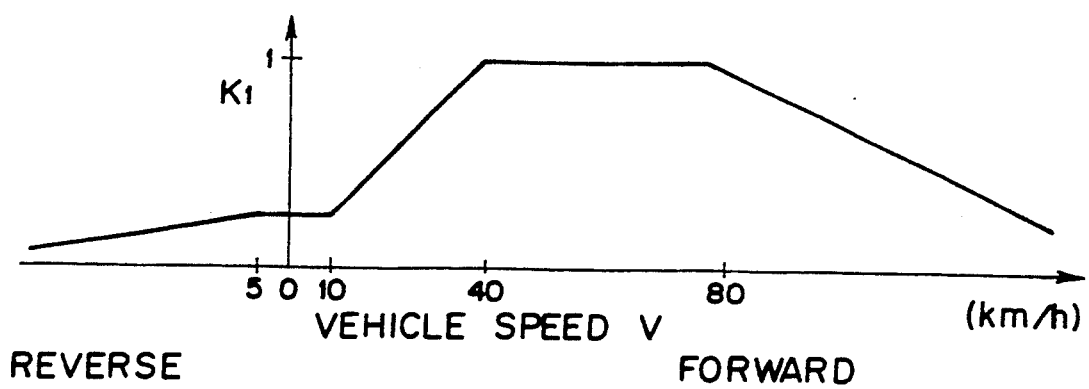
FIGS. 3 to 5 are graphs which respectively show the relations between the vehicle speed and the coefficient $K_1$, between the vehicle speed and the coefficient $K_2$ and between the vehicle speed and the coefficient $K_3$.
Figure 4:
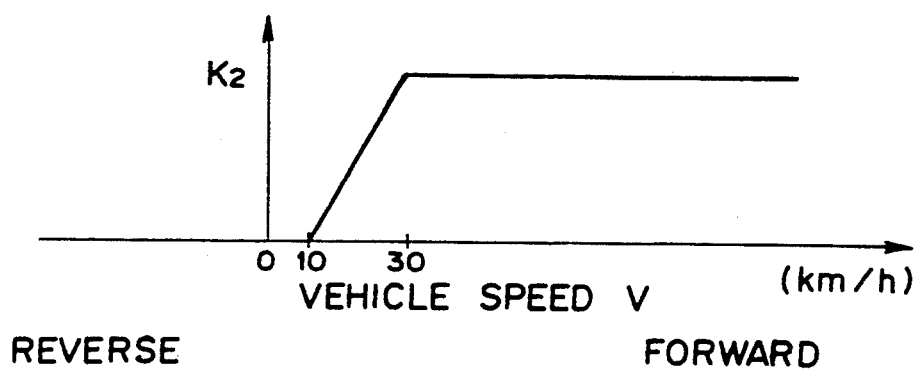
Figure 5:
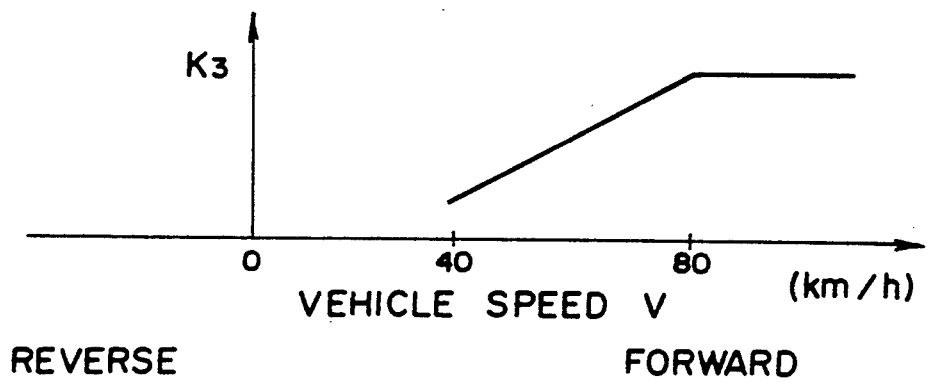

The rear wheel turning mechanism B is controlled based on the target rear wheel turning angle $TG\theta_R$ which is defined by formula $$TG\theta_R = -K_1 \cdot \theta_F + K_2 \cdot V \cdot \dot{\Psi} + K_3 \cdot V \cdot \ddot{\Psi}$$

wherein $K_1$, $K_2$ and $K_3$ respectively represent coefficient which vary with the vehicle speed, $\theta_F$ represents the front wheel turning angle, V represents the vehicle speed, $\dot{\Psi}$ represents the yaw rate, and $\ddot{\Psi}$ represents the yaw acceleration. The relations of the coefficients $K_1$, $K_2$ and $K_3$ are determined according to the properties of the vehicle (e.g., the wheel base, the weight of the vehicle, and the balance of the center of gravity). For example, they may be determined as shown in FIGS. 3 to 5, respectively. In the characteristic curve shown in FIG. 3, the coefficient $K_1$ is held at about 0.35 in the vehicle speed range lower than 10Km/h taking into account the practicability in a low vehicle speed range, is gradually increased with increase in the vehicle speed V between 10Km/h and 40Km/h, and is held at about 1 in the vehicle speed range between 40Km/h and 80Km/h so that the slip angle becomes substantially 0 and the drivability is ensured. In the high vehicle speed range over 80Km/h, the coefficient $K_1$ is gradually decreased with increase in the vehicle speed V so that the rear wheels are less turned for a given turning angle of the front wheels in order to ensure running stability during straight travel of the vehicle. When the vehicle reverses, the coefficient $K_1$ is held at about 0.35 in the range lower than 5Km/h where the vehicle is required to turn on a smaller radius, and is decreased with increase in the vehicle speed V in order to ensure running stability in the range over 5Km/h.

In the characteristic curve shown in FIG. 4, the coefficient $K_2$ is gradually increased from 0 to 0.005 with increase in the vehicle speed V in the vehicle speed range between 10Km/h to 30Km/h, and is held at 0.005 in the vehicle speed range over 30Km/h.

In the characteristic curve shown in FIG. 5, the coefficient $K_3$ is gradually increased when the vehicle speed V increases over about 40Km/h and held constant in the vehicle speed range over 80Km/h.

As shown in FIG. 1, the rear wheel turning mechanism B is controlled by a control unit CU. The control unit CU receives signals from a steering wheel turning angle sensor 30, a vehicle speed sensor 31, an encoder 32 which detects the angular position of the servomotor 20, a front lateral-acceleration sensor 33 and a rear lateral-acceleration sensor 34, and calculates the target rear wheel turning angle $TG\theta_R$ according to the formula above while determining the coefficients $K_1$, $K_2$ and $K_3$ according to the vehicle speed V as detected by the vehicle speed sensor 31. Then the control unit CU calculates the deviation $TG\Delta\theta_R$ of the actual rear wheel turning angle from the target rear wheel turning angle $TG\theta_R$, and outputs a control signal corresponding to the deviation $TG\Delta\theta_R$ to the servomotor 20. The lateral acceleration sensors 33 and 34 are disposed on the longitudinal axis of the vehicle body in front of and behind the center of gravity of the vehicle body, and the present values $\dot{\Psi}n$ and $\ddot{\Psi}n$ of the yaw rate $\dot{\Psi}$ and the yaw acceleration $\ddot{\Psi}$ are calculated according to the following formulae based on the outputs of the sensors 33 and 34.

$$\dot{\Psi}n = \dot{\Psi}n-1 + (G_F - G_R)t/l$$

$$\ddot{\Psi}n = \ddot{\Psi}n-1 + (G_F - G_R)t/l$$

wherein $\dot{\Psi}n-1$ represents the preceding value of the yaw rate $\dot{\Psi}$, $G_F$ represents the output of the front lateral-acceleration sensor 33, $G_R$ represents the output of the rear lateral-acceleration sensor 34, t represents the measuring interval, l represents the distance between the sensors 33 and 34 and $\ddot{\Psi}n-1$ represents the preceding value of the yaw acceleration $\ddot{\Psi}$. A yaw rate sensor which directly measures the yaw rate $\dot{\Psi}$ may be provided instead of the lateral acceleration sensors 33 and 34.

The control system of the rear wheel turning system of this embodiment is of a double structure for the purpose of fail-safe.

Figure 6:
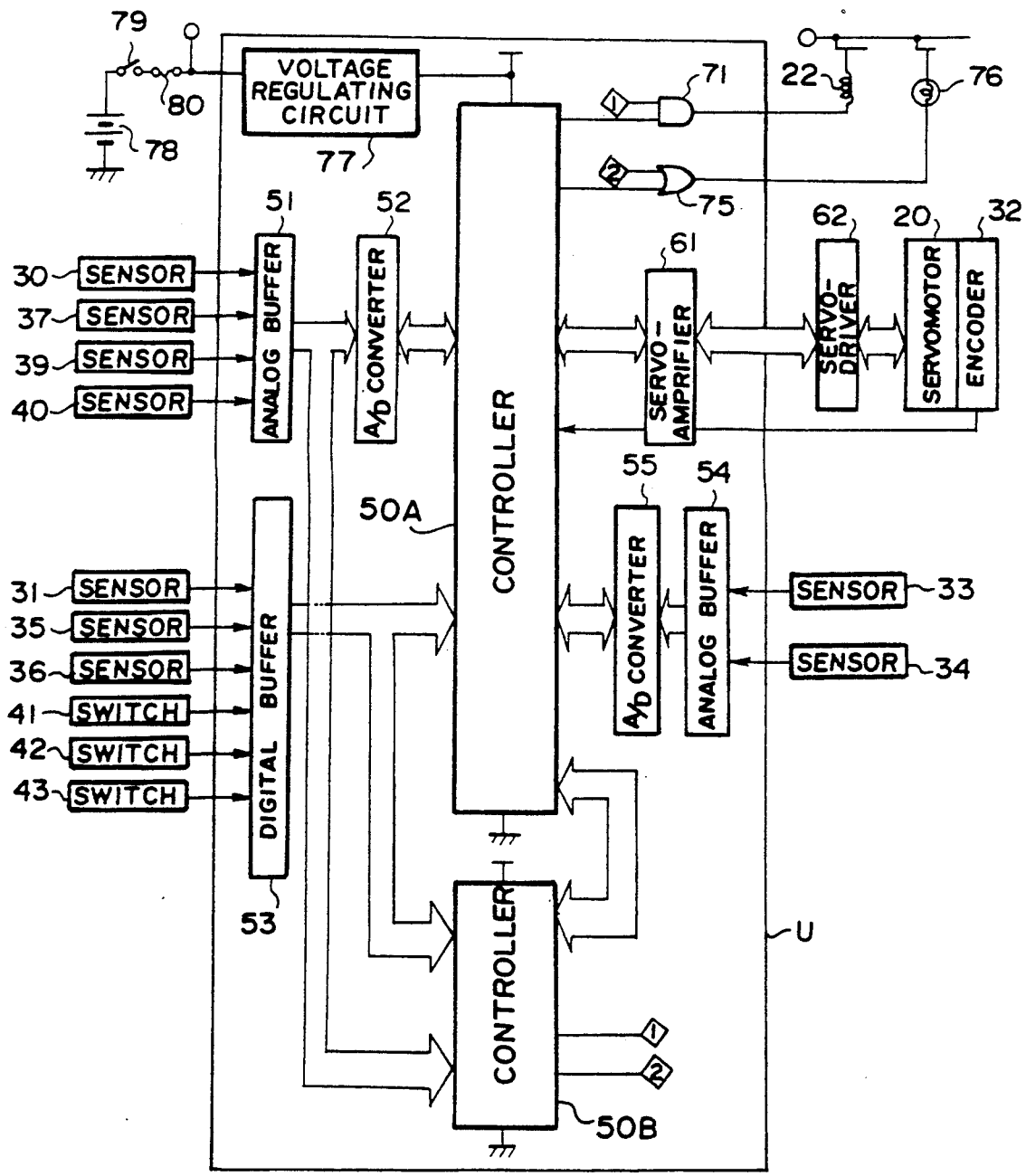
FIG. 6 is a block diagram of the control unit.

That is, as shown in FIG. 6, a front wheel turning angle sensor 35 is provided in addition to the steering wheel turning angle sensor 30, a second vehicle speed sensor 36 is provided in addition to the vehicle speed sensor 31, and a rear wheel turning angle sensor 37 which detects the turning angle of the rear wheels through the mechanical displacement of a member on the connecting rod side of the clutch 22 is provided in addition to the encoder 32, and the rear wheels are turned only when the outputs of each pair of sensors conform to each other. For example, when the output of the vehicle speed sensor 31 differs from that of the second vehicle sensor 36, it is determined at least one of the vehicle speed sensors 31 and 36 fails and the rear wheels 2L and 2R are returned to the straight ahead position and held there irrespective of the turning angle of the front wheels 1L and 1R.

Further, for other various controls, the control unit CU receives signals from a vehicle level sensor 39, a rain drop sensor 40, a brake switch 41, a reverse switch 42 and an accelerator switch 43. Further, though not shown, a signal representing whether an alternator is operating is input into the control unit CU from an L-terminal of the alternator.

The vehicle level sensor 39 detects the level of the vehicle body and the weight of load on the vehicle is detected through the level of the vehicle body. The rain drop sensor 40 detects the drops of rain in order to know the friction coefficient $\mu$ of of the road surface. The brake switch 41 outputs an ON-signal when the brake pedal is pushed down, the reverse switch 42 outputs an ON-signal when the transmission shifts into reverse, and the accelerator switch 43 outputs an ON-signal when the rate of change of the amount of depression of the accelerator pedal reaches a predetermined value.

The control is effected by a main controller 50A and a sub-controller 50B which are associated with each other. The signals from the sensors 30, 37, 39 and 40 and the L-terminal of the alternator are input into the controllers 50A and 50B by way of an analog buffer 51 and an A/D convertor 52, and the signals from the sensors 31, 35 and 36 and switches 41, 42 and 43 are input into the controllers 50A and 50B by way of a digital buffer 53. Further, the signals from the lateral acceleration sensors 34 and 34 are input into the main controller 50A by way of another analog buffer 54 and another A/D convertor 55.

The control signal output from the main controller 50A is input into the servomotor 20 by way of a servo-amplifier 61 and a servo-driver 52, and causes the servomotor 20 to turn the rear wheels 2L and 2R to the target rear wheel turning angle $TG\theta_R$. The amount of rotation of the servomotor 20 is detected by the encoder 32, and the output of the encoder 32 is fed back to the main controller 50A by way of the servo-amplifier 61.

The outputs of the controllers 50A and 50B are compared by an AND-circuit 71 and the clutch 22 is caused to engage so that the connecting rod 12 is driven by the servomotor 20 only when the outputs of the controllers 50A and 50B conform to each other. Further, the outputs are compared by an OR-circuit 75 and when the outputs differ from each other, a warning lamp 76 is put on.

The rear wheel wheel turning angle control described above was began when the signal from the L-terminal of the alternator becomes high level. In FIG. 6, reference numeral 77 denotes a voltage regulating circuit which has a 5v-regulator and resets the main controller 50A when abnormality is detected, reference numeral 78 denotes a battery, reference numeral 79 denotes an ignition switch 79, and reference numeral 80 denotes fuse.

As can be understood from the description above, in the control system of this embodiment, the target rear wheel turning angle $TG\theta_R$ is defined by formula $$TG\theta_R = -K_1 \cdot \theta_F + K_2 \cdot V \cdot \dot{\Psi} + K_3 \cdot V \cdot \ddot{\Psi}$$

and the coefficient $K_3$ is increased with increase in the vehicle speed range between 40Km/h and 80Km/h so that the contribution of the third term to the target rear wheel turning angle is increased with increase in the vehicle speed. Accordingly, in the high vehicle speed range where the control system is apt to oscillate, response to control is improved and oscillation of the control system can be effectively suppressed though the heading performance at the beginning of a turn is sacrificed to some extent. In the low to middle engine speed range where the control system cannot oscillate, better heading performance is ensured.

We claim:

1. A rear wheel turning system for a four-wheel steered vehicle comprising a rear wheel turning mechanism for turning the rear wheels of the vehicle;

a front wheel turning angle detecting means for detecting a turning angle of front wheels $\theta_F$ and generating a signal indicative thereof;

a vehicle speed detecting means for detecting a vehicle speed V and generating a signal indicative thereof;

a yaw rate detecting means for detecting a yaw rate $\dot{\Psi}$ of the vehicle and generating a signal indicative thereof;

a yaw acceleration detecting means for detecting a yaw acceleration $\ddot{\Psi}$ of the vehicle and generating a signal indicative thereof; and a control means for receiving signals indicative of the detected values from said front wheel turning angle detecting means, said vehicle speed detecting means, said yaw rate detecting means and said yaw acceleration detecting means and for controlling said rear wheel turning mechanism in accordance with those detected values to turn the rear wheels by a target rear wheel turning angle $TG\theta_R$ which is defined by a formula:

$$TG\theta_R = -K_1 \cdot \theta_F + K_2 \cdot V \cdot \dot{\Psi} + K_3 \cdot V \cdot \ddot{\Psi}$$

wherein $K_1$, $K_2$ and $K_3$ respectively represent positive coefficients, and the coefficient $K_3$ is increased with an increase in the vehicle speed V over a predetermined range of vehicle speed where the coefficient $K_2$ is constant.

2. A rear wheel turning system as defined in claim 1 further comprising a means for detecting the actual angular position of the rear wheels; wherein said control means controls said rear wheel turning mechanism based on a deviation of the actual angular position of the rear wheels from the target rear wheel turning angle $TG\theta_R$.

3. A rear wheel turning system as defined in claim 1 wherein in which the coefficient $K_1$ is changed with the vehicle speed.

4. A rear wheel turning system as defined in claim 3 wherein the coefficient $K_2$ is changed with the vehicle speed.

5. A rear wheel turning system as defined in claim 1 wherein the coefficient $K_3$ is increased with an increase in the vehicle speed to a predetermined speed, and when the vehicle speed increases over said predetermined speed, the coefficient $K_3$ is fixed to a preset value.

6. A rear wheel turning system as defined in claim 1 wherein said rear wheel turning mechanism is driven by an electric motor.

* * * * *